US011181195B2

(12) United States Patent
Kehr et al.

(10) Patent No.: US 11,181,195 B2
(45) Date of Patent: Nov. 23, 2021

(54) PARKING LOCK

(71) Applicant: ZF Friedrichshafen AG, Friedrichshafen (DE)

(72) Inventors: Ulrich Kehr, Tettnang (DE); Eckhardt Lübke, Friedrichshafen (DE); Matthias Reisch, Ravensburg (DE); Tobias Baum, Wurmberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 12 days.

(21) Appl. No.: 16/850,465

(22) Filed: Apr. 16, 2020

(65) Prior Publication Data

US 2020/0332893 A1 Oct. 22, 2020

(30) Foreign Application Priority Data

Apr. 17, 2019 (DE) .................... 10 2019 205 602.4

(51) Int. Cl.
*F16H 63/34* (2006.01)
*F16D 11/14* (2006.01)
*F16H 55/17* (2006.01)

(52) U.S. Cl.
CPC .......... *F16H 63/3425* (2013.01); *F16D 11/14* (2013.01); *F16H 2055/176* (2013.01)

(58) Field of Classification Search
CPC ........................................ F16H 63/3416–3491
See application file for complete search history.

(56) References Cited

U.S. PATENT DOCUMENTS

| 6,905,004 B2 * | 6/2005 | Oppitz | ............... F16H 63/3416 188/31 |
| 2003/0075391 A1 * | 4/2003 | Oppitz | ............... F16H 63/3425 188/31 |
| 2005/0133330 A1 | 6/2005 | Stiefvater | |

FOREIGN PATENT DOCUMENTS

DE 1827231 U 2/1961

\* cited by examiner

*Primary Examiner* — David R Morris
(74) *Attorney, Agent, or Firm* — Dority & Manning, P.A.

(57) ABSTRACT

A gearwheel (10), in particular a parking interlock gear for a parking lock arrangement, includes an annular body with a radially acting first toothing (2), arranged on the outer circumference of the annular body (1), for the engagement of a locking pawl, an axially acting second toothing (3), arranged on a face end of the annular body and including a plurality of teeth (5) with oblique tooth flanks (5a, 5b), for the engagement of a corresponding axially acting third toothing (42), which includes teeth (44) with oblique tooth flanks (44a, 44b), of a shaft (40). A parking lock arrangement also includes the gearwheel.

13 Claims, 4 Drawing Sheets

PARKING LOCK

CROSS-REFERENCE TO RELATED APPLICATION

The present application is related and has right of priority to German Patent Application No. 10 2019 205 602.4 filed on Apr. 17, 2019, which is incorporated by reference in its entirety for all purposes.

FIELD OF THE INVENTION

The invention relates generally to a gearwheel, in particular a parking interlock gear for an automatic transmission, an automated transmission, or an electric drive, and a parking lock arrangement.

BACKGROUND

A parking lock is a mechanical interlock of the transmission output shaft on the transmission housing. Mostly, for this purpose, a locking pawl, which is attached to the housing, is engaged into a toothed gear of the output shaft. For road vehicles with electric traction drives, a mechanical parking lock is often required, which interlocks the drive when the vehicle is at a standstill, in order to prevent the vehicle from unintentionally rolling away.

Usually, this mechanical parking lock is implemented with the aid of an actuatable locking pawl, which engages into a groove of a gearwheel, in particular of a parking interlock gear. Upon engagement of the pawl, there may be an impact onto the parking lock if the parking lock is engaged not when the vehicle is at a standstill, but rather moving at a slow speed. This is the case, for example, when the vehicle is parked on a slight downhill gradient. This can also occur for the case in which there is a "tooth-on-tooth position" during the engagement of the parking lock and the pawl cannot engage until the vehicle rolls away. This can also occur for the case in which the parking lock is engaged by the vehicle driver before the vehicle has come to a complete stop. The parking lock, in particular the locking pawl and the parking interlock gear, must be sized in such a way that they withstand this load.

In the case of electric traction drives, the rotor of the electric machine has a considerable inertial mass. During the engagement of the parking lock from a slow speed, not only the vehicle, but also the rotor of the electric machine must be decelerated, which brings about a considerable shock loading of the parking lock. The shock energy is dissipated with the aid of a subsequent torsion oscillating process, which represents a further load on the system and is perceived as uncomfortable by the vehicle occupants.

Axial-translatory annular springs are known as components that cushion and dampen shocks, for example, as cushioning springs in railway vehicles.

SUMMARY OF THE INVENTION

Example aspects of the invention provide an alternative gearwheel, in particular a parking interlock gear, and an alternative parking lock arrangement.

The gearwheel, which, in particular, can be a parking interlock gear for a parking lock arrangement for an automatic transmission, an automated transmission, or an electric drive, includes an annular body. The annular body includes a radially acting first toothing, which is arranged on the outer circumference of the annular body, for the engagement of a locking pawl. The annular body also includes an axially acting second toothing, which is arranged on a face end of the annular body and includes a plurality of teeth including oblique tooth flanks, for the engagement of a corresponding axially acting third toothing of a shaft. Other terms for "parking interlock gear" are "parking interlock ring" or "parking gear".

The annular body of the gearwheel therefore includes two toothings. The first toothing acts radially, i.e., the teeth extend in the radial direction, and is configured for cooperating with the locking pawl of a parking lock device in a known way. The second toothing acts axially, i.e., the teeth extends in the axial direction of the gearwheel, and is configured for engaging into a shaft of the transmission in a form-locking manner. The aforementioned shaft includes, for this purpose, a third toothing, which corresponds to or complements the second toothing of the gearwheel.

The second and the third toothings are configured for converting a rotatory motion of the parking interlock gear in relation to the shaft into an axial motion of the shaft in relation to the parking interlock gear. During a turning of the second and the third toothings relative to each other, the axial distance between the gearwheel and the shaft increases. Conversely, a change in the axial direction between the shaft and the parking interlock gear results in a rotary turning of the parking interlock gear.

Toothing is understood to be the shaping of a component, in particular of the annular body or the shaft, with notches, prongs, or splines for establishing a connection and/or for increasing the friction. The term "toothing" can refer to the shape and arrangement as well as to the manufacture of the teeth.

Preferably, the flanks of the second and the third toothings are designed as helical surfaces. In this case, the angle α designates the angle between adjacent tooth flanks on the outer diameter. The slope of the helical surface determines the ratio between the translatory motion and the rotary motion of the parking interlock gear in relation to the shaft.

It is preferred that two tooth flanks, which adjoin each other, of two adjacent teeth define an angle α, which is between one hundred and twenty degrees and one hundred and sixty degrees ($120°≤α≤160°$), particularly preferably between one hundred and fifty degrees and one hundred and fifty-six degrees ($150°≤α≤156°$). Smaller angles allow for a great or greater turning of the parking interlock gear with respect to the shaft given the same translatory motion. The angle should be at least so great, however, that a self-locking is avoided, so that a translatory axial approach of the shaft and the parking interlock gear can induce a turning of the parking interlock gear.

According to the second example aspect of the invention, a parking lock arrangement is made available. The arrangement includes a first shaft, which is rotatably mounted with respect to a housing, and a parking interlock gear rotatably mounted on the first shaft, as described above. Moreover, the arrangement includes a second shaft with an axially acting third toothing for engaging into the second toothing of the parking interlock gear. The second shaft is mounted on the first shaft in a rotationally fixed manner, i.e., is connected thereto in a rotationally fixed manner. The second shaft or the parking interlock gear is axially displaceably mounted on the first shaft. Moreover, the arrangement includes a spring element axially supported on the first shaft, which is configured for axially supporting the second shaft or the parking interlock gear on the first shaft.

The first shaft, the second shaft, the parking interlock gear, and the spring element are configured in such a way that, upon engagement of the locking pawl into the first toothing of the rotating parking interlock gear, the second shaft or the parking interlock gear is pressed against the spring element, which is supported on the first shaft, in the axial direction along a displacement path with the aid of the axially acting toothings.

In a mounted condition of the parking lock arrangement, the second toothing and the third toothing of the arrangement are arranged axially opposite one another with form-lockingly intermeshing tooth flanks. In other words, there is a shaft-shaft connection, wherein the torque is transmitted by the tooth flanks. The toothing can consist, for example, of helical surfaces. The toothing can transmit a torque and an axial force between the parking interlock gear and the second shaft.

The gearwheel can be mounted on various shafts of the transmission. The first shaft can be, in particular, the transmission input shaft, an intermediate shaft of the transmission, on the output shaft or on a shaft connected to the particular shafts. Particularly preferably, the shaft is the rotor shaft of an electric machine, since, in this case, the transmission can appropriately reduce the torque from the gear via the ratio. In this way, the gearwheel can be designed to have particularly small dimensions.

If the locking pawl of the parking lock device engages into the first toothing of the gearwheel while the shaft is turning, the gearwheel or the second shaft is pressed axially against the spring element. In the process, a first portion of the rotary shock energy, which is generated via the engagement of the locking pawl into the toothing of the gearwheel, is absorbed by the spring element. In other words, the gearwheel absorbs the shock energy while the gearwheel cushions the torque shock. In addition, the load on the locking pawl is substantially reduced. After the shock has been cushioned, the spring element presses the second shaft or the parking interlock gear into a starting position.

Preferably, an arrangement, in which the second shaft is arranged coaxially to the first shaft, is rotationally fixed to the first shaft and is axially displaceably arranged on the first shaft. The second shaft can be connected to the first shaft with the aid of a fitting toothing or connector, for example, in the form of a shaft-hub connection.

The second shaft and the gearwheel can be arranged, for example, in such a way that the gearwheel is axially fixed and the second shaft is axially moveable. Upon engagement of the locking pawl, provided the gearwheel is axially fixed, the second shaft is pressed axially into the spring element.

Alternatively, the second shaft and the gearwheel can also be arranged in such a way that the second shaft is axially fixed and the gearwheel is axially moveable. Upon engagement of the locking pawl, provided the second shaft is axially fixed, the gearwheel is pressed axially into the spring element.

In addition, an example arrangement is preferred, wherein the mutually touching surfaces of the tooth flanks of the second and the third toothings form friction surfaces. A second portion of the rotary shock energy, which is generated via the engagement of the locking pawl into toothing of the gearwheel, is dissipated, via friction of the mutually touching tooth flanks of the second and third toothings, in these tooth flanks and in the spring element and is converted into heat.

As a result, the energy to be absorbed by the spring element is reduced; therefore, the spring element can be designed to have smaller dimensions. Due to the friction of the second toothing, in addition, the arising torsional vibration is damped, whereby the subsequent torsional vibration of the torsional vibration system of the parking lock arrangement subsides faster.

The spring element is preferably designed as a set of annular springs. The spring element can be arranged, in particular, coaxially to the first shaft. The set of annular springs can be in contact, in particular at one axial end, with the second shaft or with the gearwheel and, at the other axial end, in contact with the first shaft, in particular the edge of a groove, or in contact with a further element. All that matters is that the spring is axially supported on the first shaft. The advantage of the example embodiment of the spring element as a set of annular springs is that a further portion of the shock energy is dissipated by the friction in the set of annular springs. As a result, the energy to be absorbed by the spring element via elastic deformation is further reduced; therefore, the spring element can be designed to have smaller dimensions.

An arrangement is preferred, in which the second shaft and the element of the first shaft each have an L-profile, in cross-section, and the set of annular springs rests, at each of the axial ends of the set of annular springs, against a surface of the legs of the L-profiles.

Alternatively, an arrangement is preferred, in which the gearwheel and the element of the first shaft each have an L-profile, in cross-section, and the set of annular springs rests, at each of the axial ends of the set of annular springs, against a surface of the legs of the L-profiles. The L-profiles bring about a better-controllable axial guidance of the component to be moved, i.e., either the gearwheel or the second shaft. Instead of two axially opposed L-profiles, it is also possible to utilize only one L-profile.

It is preferred that the displacement travel is less than the axial extension of the teeth of the second toothing. Therefore, it is ensured that the second and the third toothings do not "jump" in the turning direction and the spring element is suddenly unloaded when the second shaft or the parking interlock gear is pressed into the spring element. This can be achieved, for example, due to the fact that the spring strength is selected accordingly.

Alternatively, it is preferred that the displacement travel is not limited to a distance less than the tooth height, i.e., contact can take place between the first shaft and the second shaft when the second shaft or the parking interlock gear is pressed into the spring element. During an overload of the arrangement, the toothings jump in the turning direction. This effect is utilized for preventing an overload of the arrangement.

It is preferred that the spring element is preloaded in such a way that, in a condition in which the locking pawl is not engaged, the second and the third toothings are pressed against each other.

The torque transmitted between the second and the third toothings increases as the axial force of the spring element increases. If there is no preload, the decelerating torque upon engagement of the locking pawl is equal to zero at the beginning and then increases. That is to say, the deceleration of the rotor also begins at zero and then increases up to a maximum value.

Due to the preload, immediately after the deflection of the second and the third toothings upon engagement of the locking pawl, the transmitted torque is greater than zero at the beginning and subsequently increases up to a maximum value.

This has the advantage that the spring can be sized to be correspondingly weaker, so that the same maximum force sets in as in the non-preloaded case in combination with the same axial travel. As a result, the mean deceleration is considerably greater than in the case without preload (because it is more uniform).

In other words, given the same maximum available turning angle, the load on the locking pawl and the first toothing due to the shock during the engagement of the locking pawl can be further reduced, since the necessary maximum deceleration is less. The locking pawl and the first toothing can therefore be designed to have smaller dimensions.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. Wherein.

DETAILED DESCRIPTION

Figure 1:
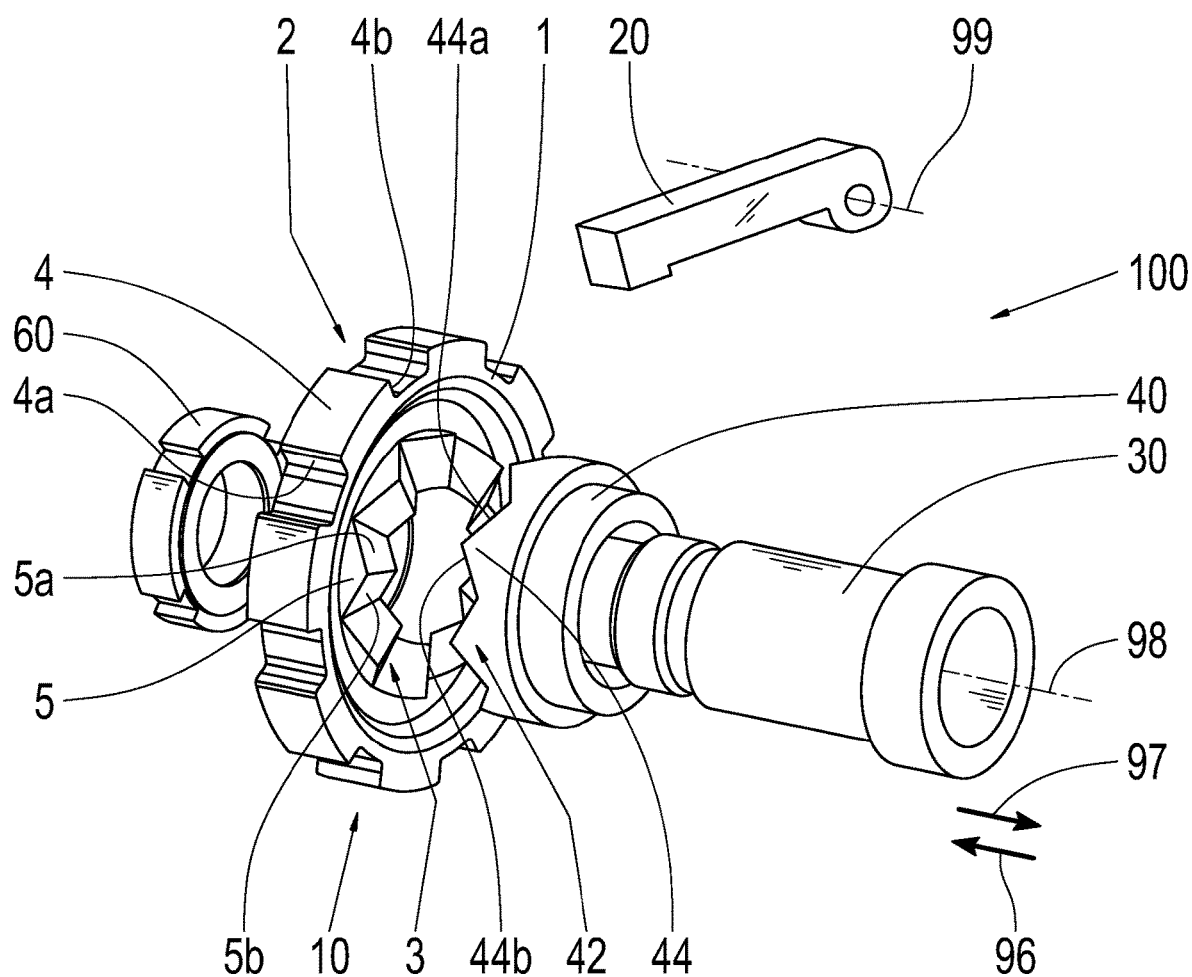
FIG. 1 shows an exploded representation of a preferred example embodiment of the gearwheel and the parking lock arrangement.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a parking lock arrangement 100 in a preferred example embodiment. The parking lock arrangement 100 includes a first shaft 30, which is rotatably mounted with respect to a housing (not represented). The shaft 30 is a rotor shaft of an electric machine.

The parking lock arrangement also includes a parking interlock gear 10, rotatably mounted at or on the first shaft 30, including an annular body 1. The annular body 1 includes, on the outer circumference of the annular body 1, a radially acting first toothing 2 for the engagement of a locking pawl 20. The first toothing 2 includes, in a known way, teeth 4 including straight-cut tooth flanks 4a, 4b. Appropriate recesses are present between adjacent teeth 4. In addition, the annular body includes an axially acting, second toothing 3 arranged on a face end of the annular body, including a plurality of teeth 5 with oblique tooth flanks 5a, 5b. The mutually adjacent surfaces of the tooth flanks 5a, 5b and 44a, 44b of the second toothing 3 and third toothing 42, respectively, form friction surfaces.

The parking lock arrangement also includes a second shaft 40 including an axially acting, third toothing 42 for engagement into the second toothing 3 of the parking interlock gear 10. The second shaft 40 is arranged coaxially to the first shaft 30, is rotationally fixed thereto, and is axially displaceably arranged thereon. The third toothing 42 includes teeth 44 with oblique tooth flanks 44a, 44b, which correspond to the tooth flanks 5a, 5b of the teeth 5. The angle between mutually adjacent tooth flanks of adjacent teeth of the same toothing is preferably between one hundred and thirty degrees and one hundred and sixty degrees ($130° \leq \alpha \leq 160°$).

The parking lock arrangement also includes a spring element 50 (see e.g., FIG. 2), which is axially supported on the first shaft 30 and is designed as a set of annular springs in the present example. The set of annular springs 50 is configured for axially supporting the second shaft 40 or the parking interlock gear 10 on the first shaft 30.

In this example embodiment, the parking interlock gear 10 is axially secured with the aid of a locking washer 60.

The parking interlock gear 10 is arranged coaxially to an axis 98. The locking pawl 20 is arranged coaxially to an axis 99. The two axes 98, 99 are arranged axially parallel to each other.

The first shaft 30, the second shaft 40, the parking interlock gear 10, and the spring element 50 are configured in such a way that, upon engagement of the locking pawl 20 into the first toothing 2 of the rotating parking interlock gear 10, the second shaft 40 is pressed against the spring element 50, which is supported on the first shaft 30, in the axial direction 97 along a displacement path with the aid of the axially acting toothings 3, 42. In other words, during the engagement of the locking pawl 20, the toothings 3 and 42, including their oblique tooth flanks, turn relative to one another in such a way that an axial motion results. This motion is directed into the set of annular springs 50.

As a result, a parking interlock gear for a parking lock arrangement as well as a parking lock arrangement are made available, which considerably reduce the load on the locking pawl.

Figure 2:
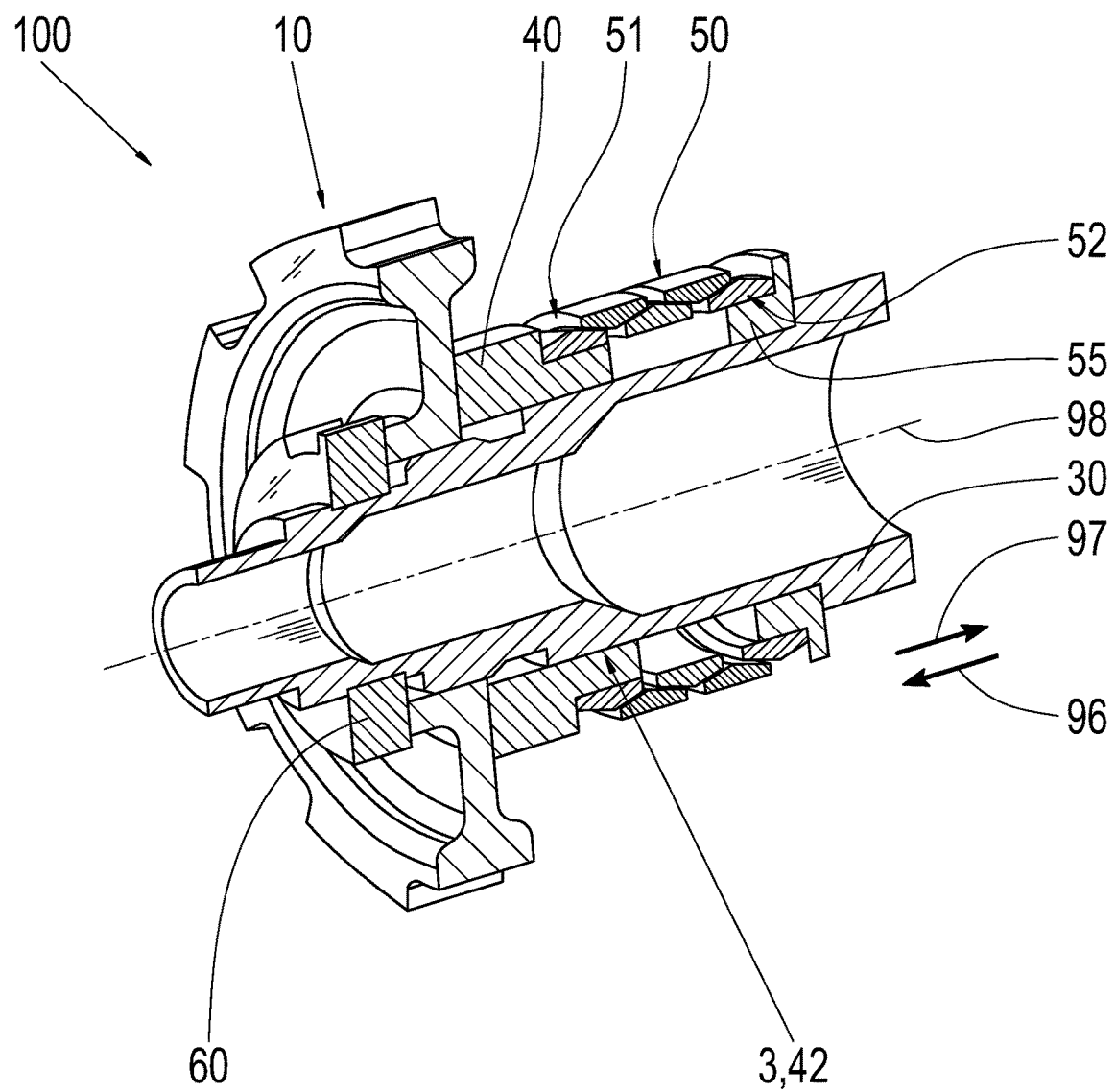
FIG. 2 shows the example gearwheel and parking lock arrangement from FIG. 1 in a longitudinal section and assembled.

FIG. 2 shows the embodiment from FIG. 1 in a longitudinal section. The parking interlock gear 10 rotates; the locking pawl is not engaged.

As is additionally apparent, the set of annular springs 50 is arranged axially between the first shaft 30 and the second shaft 40, wherein the set of annular springs 50 is in contact, via one end 51, with the second shaft 40 and, via the other end 52, with the first shaft 30. A guide ring 55, which provides the set of springs with better guidance and a better hold, is arranged between the end 52 of the set of springs 50 and the shaft 30.

As is also readily apparent, the second shaft 40 and the guide ring 55 each have an L-profile, in cross-section. The set of annular springs 50 can rest, at each of the axial ends 51, 52, against a surface of the legs of the L-profiles.

It is also apparent that the axial displacement travel of the second shaft 40, in this preferred example embodiment, is less than the axial extension of the teeth of the second toothing 3, so that the shaft 40 cannot come into contact with the guide ring 55 when the locking pawl is engaged and the shaft 40 presses into the set of springs 50.

Figure 3:
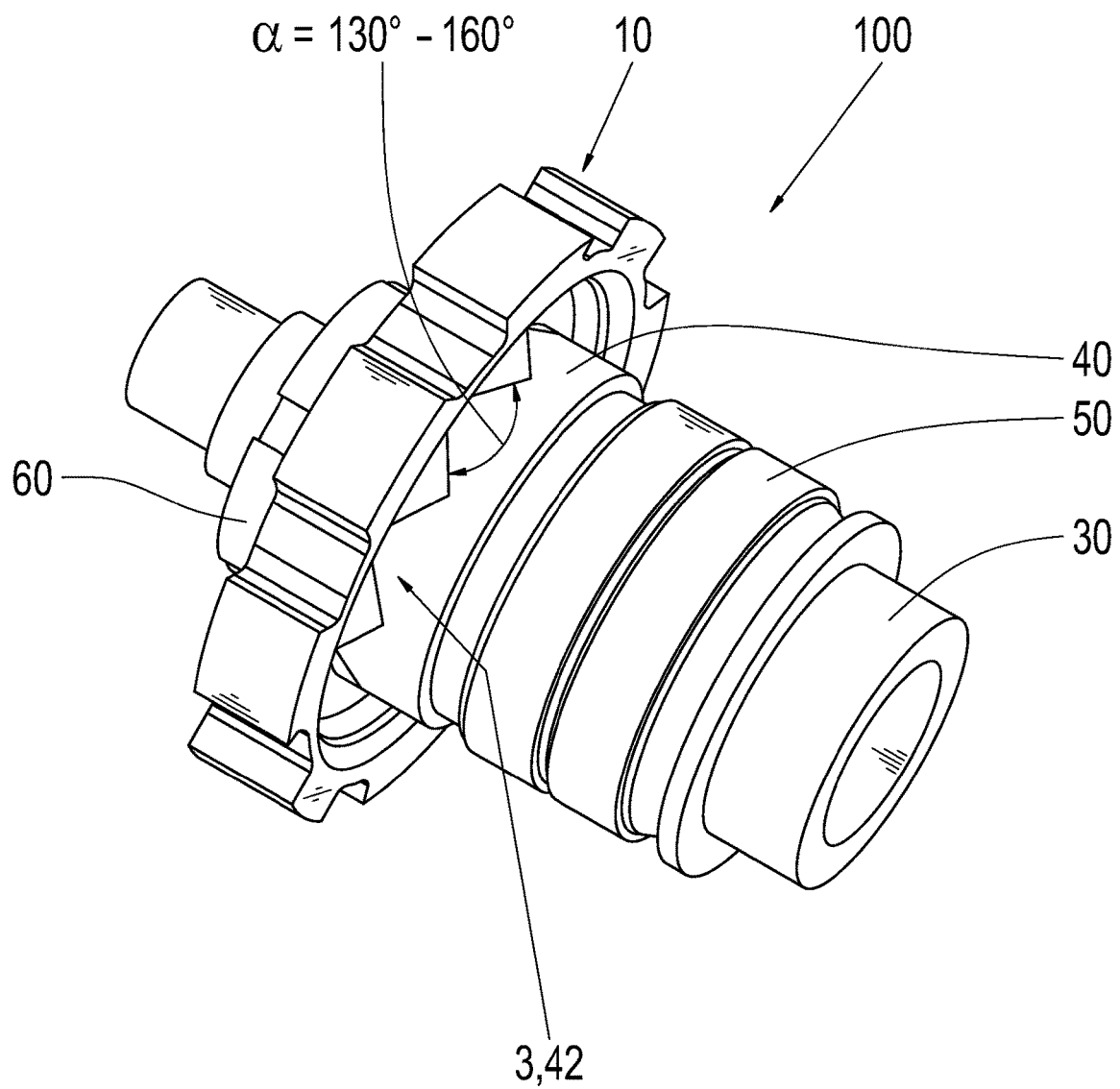
FIG. 3 shows the example gearwheel from FIG. 1 with a representation of the preferred angle of the second toothing.

FIG. 3 shows a top view of the assembled arrangement from FIGS. 1 and 2. In FIG. 3, the angles between the tooth flanks are marked.

Figure 4:
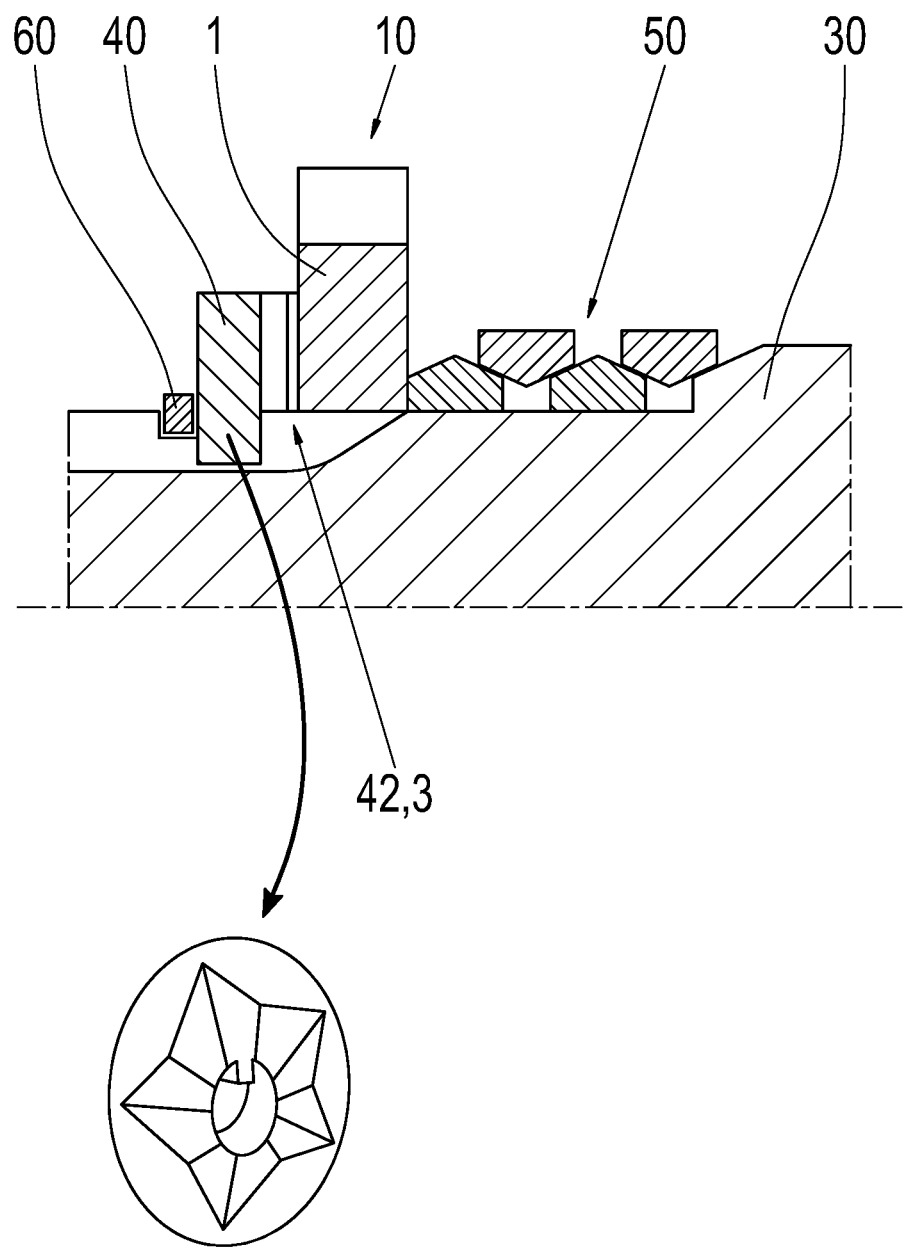
FIG. 4 shows another example embodiment of a gearwheel and a parking lock arrangement.

FIG. 4 shows an arrangement in a further preferred example embodiment. In contrast to the above-described example embodiments, the axial sequence of the parking interlock gear 10 and the second shaft 40 is interchanged. The second shaft 40 is axially secured on the shaft 30, while, in contrast, the parking interlock gear is axially movably mounted on the first shaft 30. If the locking pawl is engaged, the parking interlock gear 10 is pressed into the set of springs 50 via the axially acting toothings.

A further difference is that no guide element 55 is present. Instead, the set of annular springs 50 is in direct contact, via axial end 52, with the shaft 30. For the rest, this example embodiment corresponds to the example embodiments from FIGS. 1 through 3, so that reference is made to that which was described with respect to FIGS. 1 through 3.

The invention was comprehensively described and explained with reference to the drawings and the description. The description and the explanation are to be understood as an example and not to be limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 annular body
2 first toothing, outer toothing
3 second toothing, inner toothing
4 tooth, teeth of the first toothing
4a, 4b tooth flanks
5 tooth, teeth
5a, 5b tooth flanks, mating surface
6 recess(es) of the first toothing
7 recess(es) of the second toothing
10 gearwheel, parking interlock gear
20 locking pawl
30 first shaft, rotor shaft
40 second shaft
42 tooth, teeth of the third toothing
44 tooth, teeth of the third toothing
44a, 44b tooth flanks, mating surface
50 spring element, set of annular springs, set of springs
51 axial end of the spring element
52 axial end of the spring element
55 guide ring
60 securing ring
96 axial motion
97 axial motion
98 axis of the gearwheel, shaft
99 swivel axis of the locking pawl

The invention claimed is:

1. A gearwheel (10) that is a parking interlock gear for a parking lock arrangement, comprising:
an annular body that includes
a radially acting first toothing (2) arranged on an outer circumference of the annular body (1), the radially acting first toothing (2) configured for engaging a locking pawl (20), and
an axially acting second toothing (3) arranged on an end face of the annular body, the axially acting second toothing (3) comprising a plurality of teeth (5) with oblique tooth flanks (5a, 5b), the axially acting second toothing (3) configured for engaging a corresponding axially acting third toothing (42) of a shaft (40) that incudes teeth (44) with oblique tooth flanks (44a, 44b).

2. The gearwheel (10) of claim 1, wherein the oblique tooth flanks (5a, 5b) of the axially acting second toothing (2) are helical surfaces.

3. The gearwheel (10) of claim 1, wherein two adjoining flanks of two adjacent teeth of the axially acting second toothing (2) define an angle α, and the angle α is no less than one hundred and twenty degrees and no greater than one hundred and sixty degrees.

4. The gearwheel (10) of claim 3, wherein the angle α is no less than one hundred and fifty degrees and no greater than one hundred and fifty-six degrees.

5. A parking lock arrangement, comprising:
a first shaft (30) rotatably mounted with respect to a housing;
a parking interlock gear (10) rotatably mounted on the first shaft, the parking interlock gear (10) comprising an annular body that includes a radially acting first toothing (2) and an axially acting second toothing (3), the radially acting first toothing (2) arranged on an outer circumference of the annular body (1), the radially acting first toothing (2) configured for engaging a locking pawl (20), the axially acting second toothing (3) arranged on an end face of the annular body, the axially acting second toothing (3) comprising a plurality of teeth (5) with oblique tooth flanks (5a, 5b);
a second shaft (40) comprising an axially acting, third toothing (42) configured for engaging into the axially acting second toothing (3) of the parking interlock gear (10), the axially acting, third toothing (42) comprising teeth (44) with oblique tooth flanks (44a, 44b); and
a spring element (50) axially supported on the first shaft (30), the spring element (50) configured for axially supporting the second shaft (40) or the parking interlock gear (10) on the first shaft (30),
wherein the first shaft (30), the second shaft (40), the parking interlock gear (10), and the spring element (50) are configured such that, upon engagement of the locking pawl into the radially acting first toothing (2) of the parking interlock gear (10), the second shaft (40) or the parking interlock gear (10) is pressed against the spring element (50) in an axial direction (97) along a displacement path by the axially acting second and third toothings (3, 42).

6. The parking lock arrangement of claim 5, wherein:
the second shaft (40) is arranged coaxially to the first shaft (30) and is rotationally fixed to the first shaft (3); and
the second shaft (40) or the parking interlock gear (10) is axially displaceably arranged on the first shaft (30).

7. The parking lock arrangement of claim 5, wherein mutually adjacent surfaces of the oblique tooth flanks (5a, 5b, 44a, 44b) of the axially acting second and third toothings (3, 42) form friction surfaces.

8. The parking lock arrangement of claim 5, wherein the spring element (50) is a set of annular springs.

9. The parking lock arrangement of claim 8, wherein the set of annular springs is arranged, at least partially, axially between the first shaft (30) and the second shaft (40), and the set of annular springs contacts the second shaft (40) at one end (51) and contacts the first shaft (30) at another end (52).

10. The parking lock arrangement of claim 9, wherein the second shaft (40) and an element (55) of the first shaft (30) each have an L-shaped cross-sectional profile, and the ends (51, 52) of the set of annular springs rests against a leg surface of the L-shaped cross-sectional profile.

11. The parking lock arrangement of claim 9, wherein the parking interlock gear (10) and an element (55) of the first shaft (30) each have an L-shaped cross-sectional profile, and the set of annular springs rests, at each of its axial ends, against a surface of the legs of the L-profiles.

12. The parking lock arrangement of claim 5, wherein an axial displacement travel of the second shaft (40) or of the parking interlock gear (10) is less than an axial extension of the teeth (5) of the axially acting second toothing (3).

13. The parking lock arrangement of claim 5, wherein the spring element (50) is preloaded such that, when the locking pawl is not engaged, the axially acting second and third toothings (3, 42) are pressed against each other.

\* \* \* \* \*